(12) United States Patent
Fukushima et al.

(10) Patent No.: US 6,198,704 B1
(45) Date of Patent: Mar. 6, 2001

(54) MAGNETO-OPTICAL RECORDING MEDIUM

(75) Inventors: Yoshihito Fukushima; Jun Shimizu; Takeshi Gouko; Atsushi Takeuchi; Yuko Nakamura; Manabu Iwai, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/496,654

(22) Filed: Feb. 3, 2000

(30) Foreign Application Priority Data

Feb. 4, 1999 (JP) .................................................. 11-027881

(51) Int. Cl.[7] ...................................................... G11B 11/00
(52) U.S. Cl. .................... 369/13; 428/64.3; 428/694 ML
(58) Field of Search ................................ 369/13, 14, 110, 369/116; 360/59, 114; 365/122; 428/694 ML, 64.3

(56) References Cited

U.S. PATENT DOCUMENTS

| | | | |
|---|---|---|---|
| 5,552,237 | * 9/1996 | Utsunomiya et al. | 428/694 ML |
| 5,565,278 | * 10/1996 | Birukawa et al. | 428/694 ML |
| 5,577,021 | * 11/1996 | Nakatani et al. | 369/275.2 |
| 5,620,766 | * 4/1997 | Uchiyama et al. | 369/13 |
| 5,663,936 | * 9/1997 | Tanaka et al. | 369/13 |
| 5,700,567 | * 12/1997 | Utsunomiya | 428/332 |
| 5,751,670 | * 5/1998 | Fukushima | 369/13 |
| 5,774,430 | * 6/1998 | Ikeda | 369/13 |
| 5,777,953 | * 7/1998 | Hirokane et al. | 369/13 |
| 5,930,207 | * 7/1999 | Abiko | 369/13 |
| 6,020,079 | * 2/2000 | Matsumoto et al. | 428/694 ML |
| 6,044,044 | * 3/2000 | Miyazaki et al. | 369/13 |

* cited by examiner

*Primary Examiner*—Tan Dinh
(74) *Attorney, Agent, or Firm*—Sonnenschein, Nath & Rosenthal

(57) ABSTRACT

A magneto-optical recording medium from which data is read by using a Kerr effect and which is capable of preventing signal imbalance caused from change in birefringence even in a system in which the amplitude of a reproduced signal is small and the spatial frequency of a shortest record signal train of the magneto-optical recording medium is $1.1 \times NA/\lambda$(line/m) or higher. The photoelastic coefficient of a substrate of the magneto-optical recording medium is $50 \times 10^{-13}$ cm$^2$/dyne or smaller. The vertical birefringence of the substrate is $250 \times 10^{-6}$ or smaller, the coefficient of water absorption of the same is 0.2 wt % or lower and the thermal coefficient of expansion of the same is $6.5 \times 10^{-5}$ cm/cm·° C. or lower.

4 Claims, 3 Drawing Sheets

MAGNETO-OPTICAL RECORDING MEDIUM

RELATED APPLICATION DATA

The present application claims priority to Japanese Application No. P11-027881 filed Feb. 4, 1999 which application is incorporated herein by reference to the extent permitted by law.

BACKGROUND OF THE INVENTION

1. Field of the Invention

The present invention relates to a magneto-optical recording medium for use in a magneto-optical system for performing a reproducing operation by using a Kerr effect.

2. Description of the Related Art

In recent years, enlargement of the quantity of information has caused a requirement to arise in that also a magneto-optical recording disc for use as a data storage device has a larger capacity.

A most direct method of raising the density of the magneto-optical recording disc is to reduce the size of a spot formed by reproducing light, that is, to shorten the wavelength of the laser beam. Since shortening of the wavelength of the laser beam, however, encounters difficulties, satisfactory shortening of the wavelength has not been achieved as compared with raising of the density of the magneto-optical recording disc.

Therefore, the density of the magneto-optical recording medium has been realized by reducing track pitches and by raising the linear density rather than by reducing the diameter of the laser beam by shortening the wavelength of the laser beam. Moreover, deterioration in the quality of the signal caused from the foregoing means is modified by employing signal processing techniques including PRML (Partial Response Maximum Likelihood).

On the other hand, attempts have energetically been made in recent years to obtain a resolution higher than that determined by the wavelength of the laser beam.

One of the foregoing techniques has been reported, that is, a magnetically induced super resolution (which is hereinafter called an "MSR") technique which uses magnetic switched connection. The foregoing technique includes a method (Front Aperture Detection which is hereinafter called a "FAD") with which magnetization directions in hot portions of the beam spot are made coincide with one another. Thus, detection of the signal is performed in only cold portions. Another method (Rear Aperture Detection which is hereinafter called "RAD") is included in the foregoing techniques, the method having steps of making magnetization directions in cold portions coincide with one another (masked) and detecting the signal in only hot portions. Since both of the methods encounter reduction in the reproducible area, an effect can be obtained which is the same as that obtainable from reduction in the reproducing beam.

In either case, the intensity of the signal is weakened, causing the tolerance of the system against change in the reproduced signal to become unsatisfactory.

When a reproduced signal in the form as shown in FIG. 1 has a local change (signal imbalance) as shown in FIG. 2 the error rate is raised in the portion in which the change has occurred. As the amplitude of the reproduced signal is reduced or as the local change is made to be great raising of the error rate becomes conspicuous.

When transparent substrates of usual magneto-optical recording discs are manufactured in quantity, the manufacturing cost is reduced. Therefore, disc substrates obtained by injection-molding a polymer material, such as polycarbonate., are widely used.

In general, the plastic substrate has photoelasticity. Therefore, if local dispersion of internal stresses in the substrate causes change in birefringence to occur. The local change in the birefringence results in signal imbalance of an MO signal.

Therefore, a magneto-optical system of a type having a raised recording density and thus suffering from weaker intensity of the signal must prevent the signal imbalance caused from the birefringence.

When the track pitches are reduced, there arises a problem of crosstalk of signals recorded on the adjacent tracks. Since the crosstalk is considerably affected by the warp of the magneto-optical recording disc, the warp of the magneto-optical disc must be prevented as the track pitch is reduced. In a case of a magneto-optical disc having a single-plate structure, the disc warps occurs when the environmental temperature and/or humidity has been changed. The foregoing fact is caused from difference in the expansion or the contraction between the two sides of the magneto-optical disc.

As described above, the magneto-optical disc having the single-plate structure must prevent the warp of the disc even if the environmental temperature and humidity are changed.

SUMMARY OF THE INVENTION

In view of the foregoing an object of the present invention is to provide a magneto-optical recording medium capable of reducing signal imbalance which is caused from change in the birefringence and reducing the error rate even if the magneto-optical recording medium is adapted to a system having a small amplitude of reproduced signals.

Another object of the present invention is to provide a magneto-optical recording medium capable of preventing jitters and satisfactorily preventing warp which is caused from change in the environmental temperature and humidity thereof.

The inventors of the present invention have performed studies to achieve the above-mentioned objects. As a result, a fact has been detected. That is, when the photoelastic coefficient of a substrate is made to be smaller than a predetermined value signal imbalance can satisfactorily be prevented.

A magneto-optical recording medium according to the present invention has been achieved in accordance with the detected fact. According to the present invention, there is provided a magneto-optical recording medium comprising: a substrate incorporating a first dielectric film, a magneto-optical recording film, a second dielectric film a reflecting film and a protective layer which are sequentially formed thereon so that a Kerr effect is used to read data, wherein when assumptions are made that the wavelength of reproducing light is $\lambda$(m) and the number of apertures of a lens is NA the spatial frequency of a shortest recorded signal train is $1.1 \times NA/\lambda$(line/m) or greater and the photoelastic coefficient of the substrate is $50 \times 10^{-13}$ cm$^2$/dyne.

When the photoelastic coefficient of the substrate is $50 \times 10^{-13}$ cm$^2$/dyne, signal imbalance can satisfactorily be prevented. Specifically, the signal imbalance can be reduced to 0.2 or smaller when a phase difference of the optical system satisfies ±7.

When the vertical birefringence of the substrate is $250 \times 10^{-6}$ or smaller, jitters can be prevented.

When the coefficient of water absorption of the substrate is 0.2 wt % or lower and the thermal coefficient of expansion of the substrate is $6.5\times10^{-5}$ cm/cm·° C. or lower warp of the disc caused from change in the environmental temperature and humidity can be prevented to satisfy a predetermined range even if the disc is formed into a single plate.

Other objects, features and advantages of the invention will be evident from the following detailed description of the preferred embodiments described in conjunction with the attached drawings.

DESCRIPTION OF THE PREFERRED EMBODIMENTS

A magneto-optical recording medium according to the present invention will now be described.

The magneto-optical recording medium according to the present invention has a structure similar to that of a usual magneto-optical recording medium. The basic structure is arranged such that a magneto-optical recording layer is formed on a substrate of the magneto-optical recording medium. As a matter of course, design is so performed that a reflecting film dielectric films are formed in addition to the magneto-optical recording layer to maximally use the reading characteristic permitted by the Kerr effect.

Figure 1:
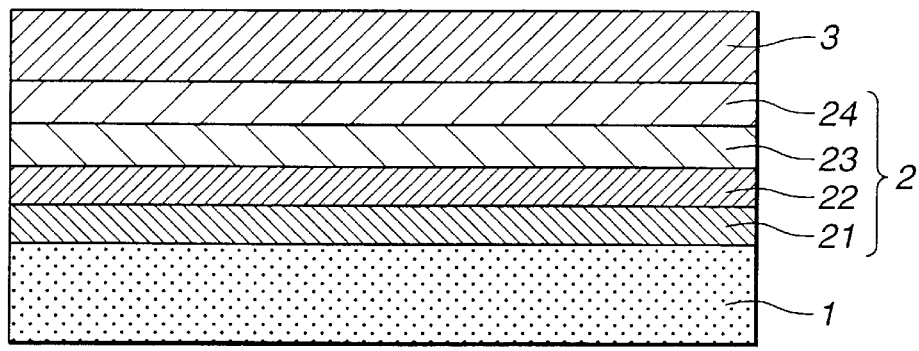
FIG. 1 is a schematic cross sectional view showing an essential portion of an example of the structure of a magneto-optical recording medium according to the present invention.

FIG. 1 shows an example of the structure of an embodiment of the magneto-optical recording medium according to the present invention. A recording layer 2 and a protective layer 3 are formed on a substrate 1. The recording layer 2 is formed into a four-layer structure composed of a first dielectric film 21 made of SiN or the like, a magneto-optical recording film 22 made of a magneto-optical recording magnetic material, a second dielectric film 23 made of SiN or the like and a reflecting film 24 made of Al or the like.

The magneto-optical recording medium according to the present invention and having the above-mentioned basic structure is formed such that when assumptions are made that the wavelength of reproducing light is $\lambda$(m) and the number of apertures of a lens is NA, the spatial frequency of a shortest recorded signal train is $1.1\times NA/\lambda$(line/m) or greater. The present invention can preferably be applied to a magneto-optical recording medium of a type for reading a signal by using magnetically induced super resolution (MSR) using magnetic switched connection.

The MSR includes a method (Front Aperture Detection which is hereinafter called a "FAD") with which magnetization directions in hot portions of the beam spot are made coincide with one another. Thus, detection of the signal is performed in only cold portions. Another method (Rear Aperture Detection which is hereinafter called "RAD") of the MSR has steps of making magnetization directions in cold portions coincide with one another and detecting the signal in only hot portions. The present invention may be applied to either method.

As a result of investigations formed by the inventors of the present invention, a magneto-optical recording medium having the spatial frequency of the shortest recorded signal train of $1.1\times NA/\lambda$(line/m) or greater encounters rapid enlargement of signal imbalance.

In the present invention the magneto-optical recording medium having the spatial frequency of the shortest recorded signal train of $1.1\times NA/\lambda$(line/m) or greater is structured such that the photoelastic coefficient of the substrate is $50\times10^{-13}$ cm$^2$/dyne. Thus, the signal imbalance can be prevented to satisfy an appropriate range.

The photoelastic coefficient of the substrate can be controlled by selecting, for example, the type of a monomer for use to prepare polycarbonate resin and synthesizing conditions.

The polycarbonate resin which satisfies the above-mentioned conditions is exemplified by polycarbonate resin obtained by causing a precursor substance to react with dihydric phenol, the main component of which is 2, 2-bis (3-methyl-4-hydrophenyl) propane. It is preferable that 2, 2-bis(3-methyl-4-hydrophenyl) propane exhibiting a high purity of 99.0% or higher is employed which is realized by maximally removing impurities which is biproduct when the operation for preparing 2, 2-bis(3-methyl-4-hydrophenyl) propane is performed.

Substitution of other dihydric phenol for a portion (which is usually 20 mol % or smaller and preferably 10 mol % or smaller) of 2, 2-bis(3-methyl-4-hydrophenyl) propane is permitted.

The other dihydric phenol is exemplified by 2, 2-bis(4-hydrophenyl) propane (usually called bisphenol A), 2, 2-bis (4-hydroxy-3-ethylphenyl) propane, 2, 2-bis(4-hydroxy-3-sec-butylphenyl) propane, 2, 2-bit(4-hydroxy-tert-butylphenyl) propane, 4, 4-bis(4-hydrophenyl) butane and 2, 2-bis(4-hydrophenyl) pentane. A trifunctional compound in a small quantity may simultaneously be employed. The carbonate precursor allowed to react with dihydric phenol is exemplified by phosgene and diphenyl carbonate.

The process for preparing polycarbonate resin from dihydric phenol and carbonate precursor is performed by using a reaction which is performed when polycarbonate resin is prepared from usual bisphenol A. The reaction is exemplified by interfacial polycondensation between dihydric phenol and phosgene or an ester interchange reaction between dihydric phenol and diphenylcarbonate.

It is preferable that the vertical birefringence, the coefficient of water absorption and thermal coefficient of expansion of the substrate are controlled to appropriate values as well as the photoelastic coefficient.

It is preferable that the vertical birefringence of the surface is $250\times10^{-6}$ or smaller. Thus, jitters can satisfactorily be prevented.

It is preferable that the coefficient of water absorption of the substrate is 0.2 wt % or lower and the thermal coefficient of expansion of the same is $6.5\times10^{-5}$ cm/cm·° C. or lower. Thus, warp of the disc caused from change in the environmental temperature and humidity can be prevented even if the disc is in the form of a single plate.

The vertical birefringence, the coefficient of water absorption and the thermal coefficient of expansion can be controlled by selecting the material of the substrate and by adjusting the injection molding conditions.

EXAMPLES

Results of experiments will now be described.

Photoelastic Coefficient of Substrate

Optical discs for use in the examples were groove-recording format optical discs having a track pitch of 0.85 μm.

As shown in FIG. 1, the optical disc incorporated a substrate 1 made of polycarbonate, a recording layer 2 formed on the substrate 1 and a protective layer 3 formed on the recording layer 2.

The photoelastic coefficient of the substrate 1 was $45 \times 10^{-13}$ cm$^2$/dyne.

The recording layer 2 was constituted by laminating a first dielectric film 21 made of SiN or the like, a magneto-optical recording film 22 made of a magnetic material for making a magneto-optical recording film, a second dielectric film 23 made of SiN or the like and a reflecting film 24 made of Al or the like. The magneto-optical recording film 22 was formed into a single-plate film made of TbFeCo. The thus manufactured disc was called disc A.

To make a comparison, another disc was prepared which incorporated the substrate 1 having a photoelastic coefficient of $80 \times 10^{-13}$ cm$^2$/dyne and which had the other structures which were the same as those of the disc A. The thus-manufactured disc was called disc B.

A drive employed as a signal measuring apparatus had a wavelength (λ) of 680 nm and incorporated an objective lens having a number of apertures (NA) of 0.55.

The reproducing method was a usual reproducing method which is widely employed by the magneto-optical recording system as a substitute for the MSR method.

Figure 3:
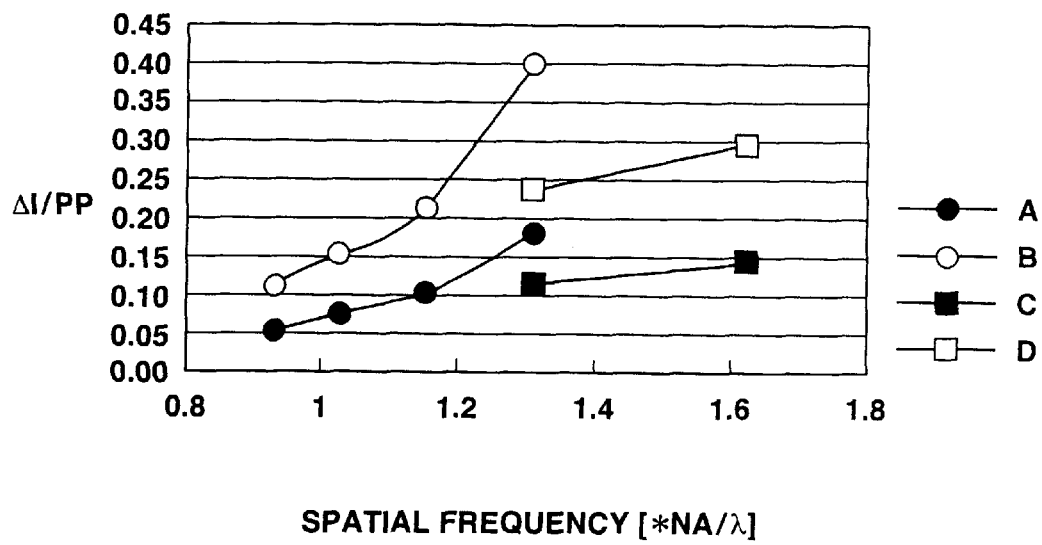
FIG. 3 is a graph showing dependency of the signal imbalance on the spatial frequency of recorded signal train.

FIG. 3 shows results of measurement of dependency of signal imbalance on spatial frequency of the recorded signal of the disc A and the disc B.

Figure 2:
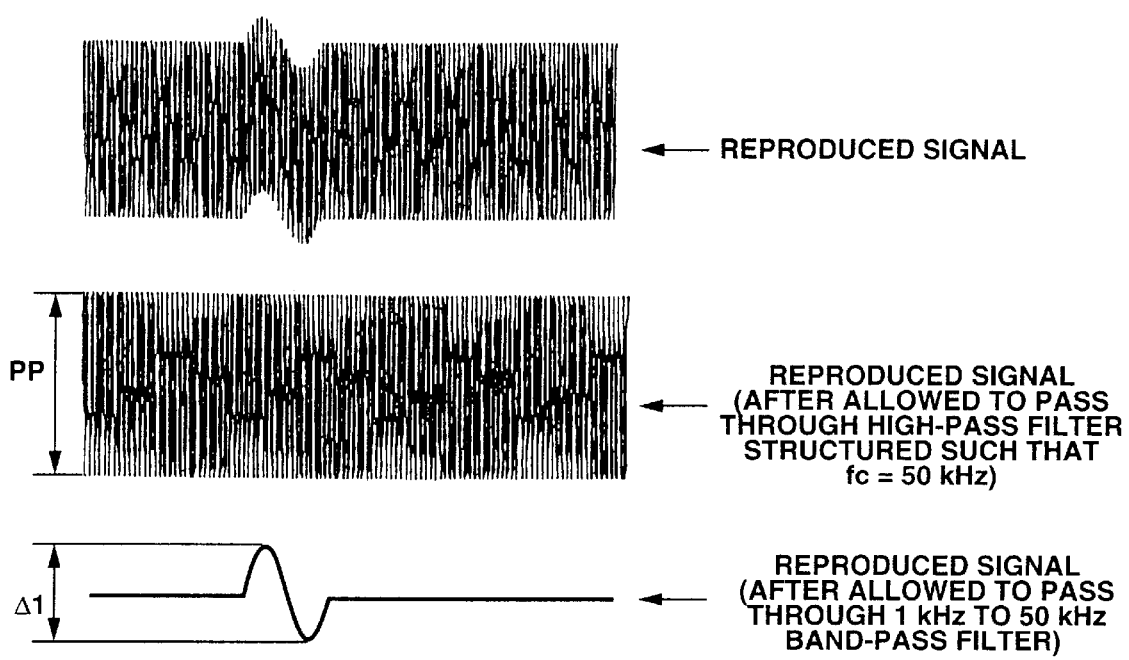
FIG. 2 is a schematic view showing signal imbalance.

As shown in FIG. 2, the values of signal imbalances shown in the graph were obtained by, with amplitudes of signals, standardizing variations of signals realized when reproduced signals recorded in response to corresponding recording signals were allowed to pass through a 1 kHz to 5 kHz bandpass filter. The signal imbalance was defined as ΔI/PP.

The signal imbalance is defined to be 0.2 or smaller in, for example, ISO/IEC15286 (5.2 GB. 130 mm-MO) or ISO-IEC15041 (640 MB, 90 mm-MO).

As can be understood from FIG. 3, when the spatial frequency of the recording signal train was raised, the amplitude of the signal was reduced. Therefore, the signal imbalance was enlarged. The signal imbalance of the disc B (indicated with a line B) was made to be larger than 0.2 when the spatial frequency of the recorded signal was larger than 1.1×NA/λ(line/m).

The photoelastic coefficient of the disc A (indicated with a line A) had a photoelastic coefficient smaller than that of the substrate of the disc B. Therefore, the value of the signal imbalance was enabled to be 0.2 or smaller when the spatial frequency of the recorded signal was higher than 1.1×NA/λ(line/m).

Also a land-recording format magneto-optical recording medium having a track pitch of 0.9 μm and adapted to the MSR reproducing method were evaluated similarly.

Similarly to discs A and B, the magneto-optical recording medium, as shown in FIG. 3, incorporated a substrate 1 made of polycarbonate, a recording layer 2 formed on the substrate 1 and a protective layer 3 formed on the recording layer 2.

The photoelastic coefficient of the substrate 1 was $45 \times 10^{-13}$ cm$^2$/dyne. The recording layer 2 incorporated a first dielectric film 21 made of SiN or the like, a magneto-optical recording film 22 made of a magnetic material for making a magneto-optical recording film, a second dielectric film 23 made of SiN or the like and a reflecting film 24 made of Al or the like. To perform the MSR reproduction, the magneto-optical recording film 22 was formed into a triple-layer structure composed of GdFeCo/GdFeCoSi/TbFeCo. The manufactured disc was called disc C.

To make a comparison, disc D having a photoelastic coefficient of $80 \times 10^{-13}$ cm$^2$/dyne and other structures which were similar to those of disc C was prepared.

FIG. 3 shows results of measurement of dependency of signal imbalances of discs C and D on the spatial frequency of the recorded signal trains.

Since the resolution is raised when the MSR reproduction is performed, the amplitude of the signal is enlarged at a spatial frequency of a recorded signal train of 1.32×NA/λ (line/m) as compared with usual reproduction. Therefore, the signal imbalance is reduced. Note that the disc D (indicated with a line D) had a value of the signal imbalance of 0.2 or greater. On the other hand, the disc C (indicated with a line C) incorporating the substrate which had the small photoelastic coefficient enabled the value of the signal imbalance lo be 0.2 or smaller.

Figure 4:
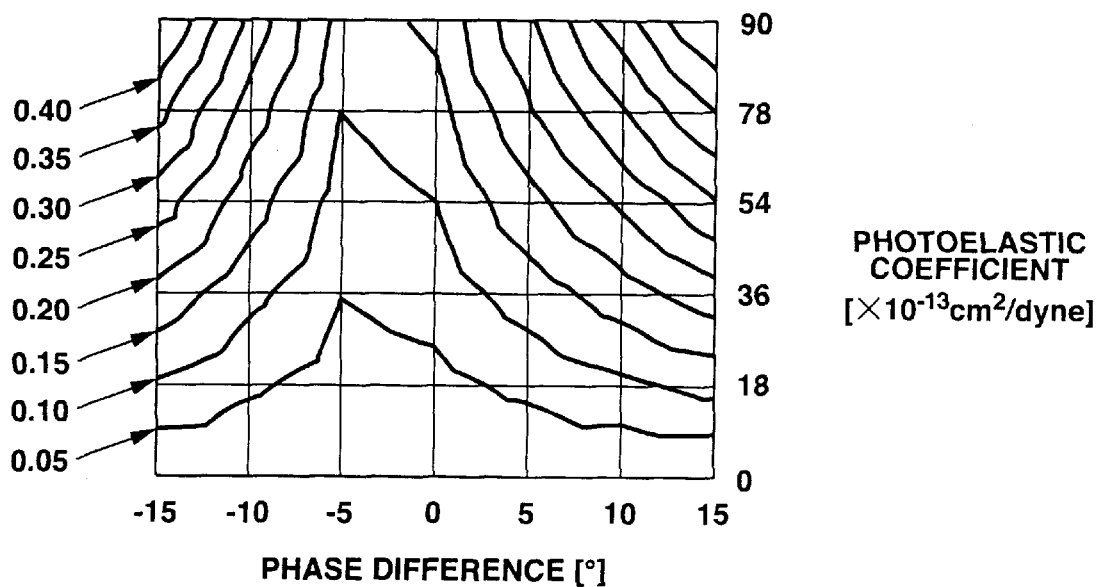
FIG. 4 is a graph showing the relationship among phase differences in the optical system, photoelastic coefficients and signal imbalance.

Then, the magnitude of the stress was estimated from obtained data of performed experiments. In accordance with the estimated stress, the relationship among the phase differences of the optical system, the photoelastic coefficients of the substrate and signal imbalances was calculated. Results were shown in FIG. 4.

In general, distribution of stresses which exert birefringence change on small regions cannot easily be measured. Therefore, a model was employed which was structured such that distribution of stresses generated adjacent to spherical foreign matter causes birefringence change to occur.

The calculation was performed by using parameters arranged such that the inplane birefringence of the substrate was 0 nm, the Kerr rotational angle of the MO film was 0.69° and the Kerr ellipticity was 0.23°. To obtain the magnitude of the stress, two data items were used, one of which was structured such that the phase difference of the optical system was zero degree, the photoelastic coefficient of the substrate was 45×10 cm$^2$/dyne and the signal imbalance was 0.08. Another data item was structured such that the phase difference of the optical system was zero degree, the photoelastic coefficient of the substrate was 80×10 cm$^2$/dyne and the signal imbalance was 0.15. The foregoing values corresponded to data obtainable from an experiment shown in FIG. 3 and performed when the spatial frequency of the recorded signal was 1.1×NA/λ.

The signal imbalance greatly depends on the phase difference of the optical system. The phase difference of the optical system is regulated by, for example, ISO/IEC15288 (5.2 GB, 130 mm-MO) and ISO/IEC15041 (640 MB, 90 mm-MO) to be ±15. The variation of the actual drive may be estimated to be about ±7. As can be understood from FIG. 4, the signal imbalance can be reduced to be 0.2 or smaller when the phase difference of the optical system satisfies ±7 if the photoelastic coefficient of the substrate is 50×10 cm$^2$/dyne or smaller.

The foregoing calculation was performed under conditions that the amplitude of the signal corresponds to 1.1×

NA/λ and the inplane birefringence of the substrate was 0 nm. As the spatial frequency is raised, the amplitude of the signal is reduced. When the absolute value of the inplane birefringence is enlarged, the variation of the signal is enlarged. In either case, the signal imbalance is enlarged. Therefore, the condition that the photoelastic coefficient is 50×10 cm²/dyne is, as a matter of course, a requirement.

Vertical Birefringence, Coefficient of Water Absorption and Thermal Coefficient of Expansion of Substrate The optical disc for use in the evaluation had a groove-recording format optical disc having a track pitch of 0.85 μm. The optical disc had a diameter of 130 mm and formed into a bonded structure conforming to ISO-IEC15286.

As shown in FIG. 1, the optical disc incorporates a substrate 1 made of polycarbonate and a protective layer 3 formed on a recording layer 2 formed on the substrate 1. The vertical birefrincence of the substrate 1 was 200×10$^{-6}$ and the inplane birefringence was −5 nm. The sign of the inplane birefringence was positive when the radial direction was an advancement axis. The photoelastic coefficient was 45×10$^{-13}$ cm²/dyne. The recording layer 2 incorporated a first dielectric film 21 made of SiN or the like, a magneto-optical recording film 22 made of a magnetic material for use to form a magneto-optical recording film, a second dielectric film 23 made of SiN or the like and a reflecting film 24 made of Al or the like. The magneto-optical recording film 22 had a single-layer structure made of TbFeCo (disc A).

As a comparative example, a disc (disc B) was prepared which was structured such that the vertical birefringence of the substrate 1 was 450×10$^{-6}$, the inplane birefringence was −5 nm, the photoelastic coefficient was 80×10$^{-13}$ cm²/dyne and the other structures were similar to those of the disc A.

A drive was employed as a signal measuring apparatus which was structured such that the (λ) was 680 nm and the number of apertures (NA) of an objective lens was 0.55.

The reproducing method was a usual reproducing method which is widely employed by the magneto-optical recording system as a substitute for the MSR method.

Figure 5:
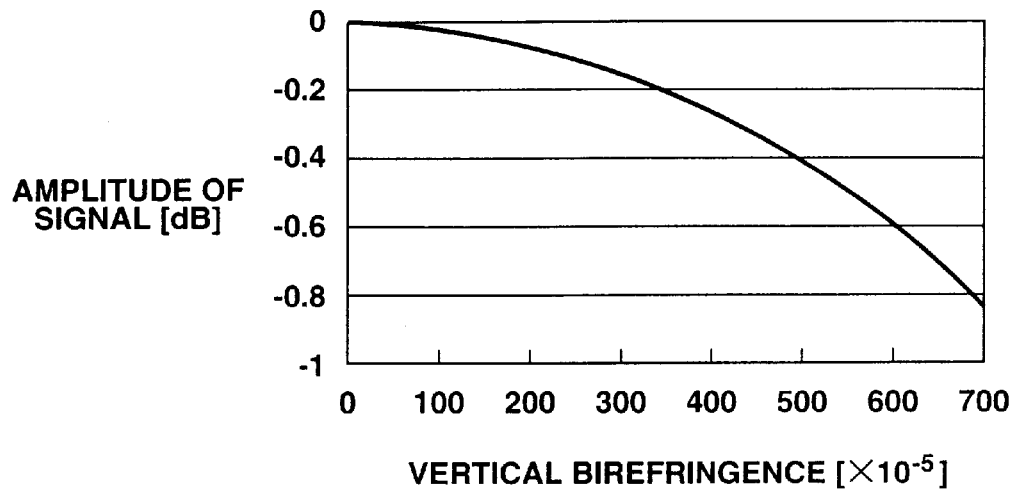
FIG. 5 is a graph showing the relationship between vertical birefringence of the substrate and amplitudes of signals.

In general, the vertical birefringence of the substrate exerts an influence on the signal characteristics. When the vertical birefringence is enlarged, a phase difference occurs with respect to a light beam made diagonally incident on the substrate. Therefore, the amplitude of the signal is reduced. Results of calculations of the model about the vertical birefringence of the substrate and the amplitude of the signal are shown in FIG. 5. The calculation was performed under conditions that the wavelength of the laser beam was such that λ=680 nm and the number of apertures of the objective lens was such that NA=0.55. When the vertical birefringence of the substrate is large, aberration of the laser beam occurs. Thus, the signal deteriorates. If the vertical birefringence is 250×10$^{-4}$ or smaller, deterioration in the amplitude of the signal caused from the vertical birefringence can be prevented.

Also in this evaluation in which a signal having a spatial frequency of 1.16×NA/λ was recorded, the CNR of the disc B was 48.7 dB in contrast to the CNR of the disc A which was 49.5 dB.

Then, a land-recording format magneto-optical recording medium having a track pitch of 0.9 μm and adapted to the MSR reproduction method was similarly evaluated.

The magneto-optical recording medium had a single-plate structure having a diameter of 90 mm conforming to ISO/IEC15041. Similarly to discs A and B, the magneto-optical recording medium, as shown in FIG. 1, incorporates a recording layer 2 formed on a substrate 1 made of polycarbonate and a protective layer 3 formed on the recording layer 2. The vertical birefringence of the substrate 1 was 200×10$^{-6}$ and the inplane birefringence of the same was −5 nm. The sign of the inplane birefringence was positive when the radial direction was an advancement axis. The photoelastic coefficient of the substrate 1 was 45×10$^{-13}$ cm²/dyne. The coefficient of water absorption of the substrate was 0.15 wt % and the linear expansion coefficient was 6.1×10$^{-5}$ cm/cm·° C. The recording layer 2 was constituted by laminating a first dielectric film 21 made of SiN or the like, a magneto-optical recording film 22 made of a magnetic material for forming a magneto-optical recording film, a second dielectric film 23 made of SiN or the like and a reflecting film 24 made of Al or the like. To perform the MSR reproduction, the magneto-optical recording film 22 had a triple-layer structure composed of GdFeCo/GdFeCoSi/TbFeCo (disc C).

As a comparative example, a disc was prepared which incorporated a substrate 1 having a structure that a vertical birefringence of 450×10$^{-6}$, an inplane birefringence of −5 nm, a photoelastic coefficient of 80×10$^{-13}$ cm²/dyne, a coefficient of water absorption of 0.23 wt % and a linear expansion coefficient of 7.1×10$^{-5}$ cm/cm·° C. and other structures were similar to those of the disc C (disc D).

When a signal having a spatial frequency of 1.63×NAλ was recorded, the CNR of the disc C was 47.7 dB and that of the disc D was 47.2 dB. When a random pattern signal ((1, 7) conversion NRZI recording) formed such that the shortest record signal had a spatial frequency of 1.63×NA/λ was recorded, the disc C encountered jitters of 8.39%. On the other hand, the disc D encountered jitters of 9.36%.

Figure 6:
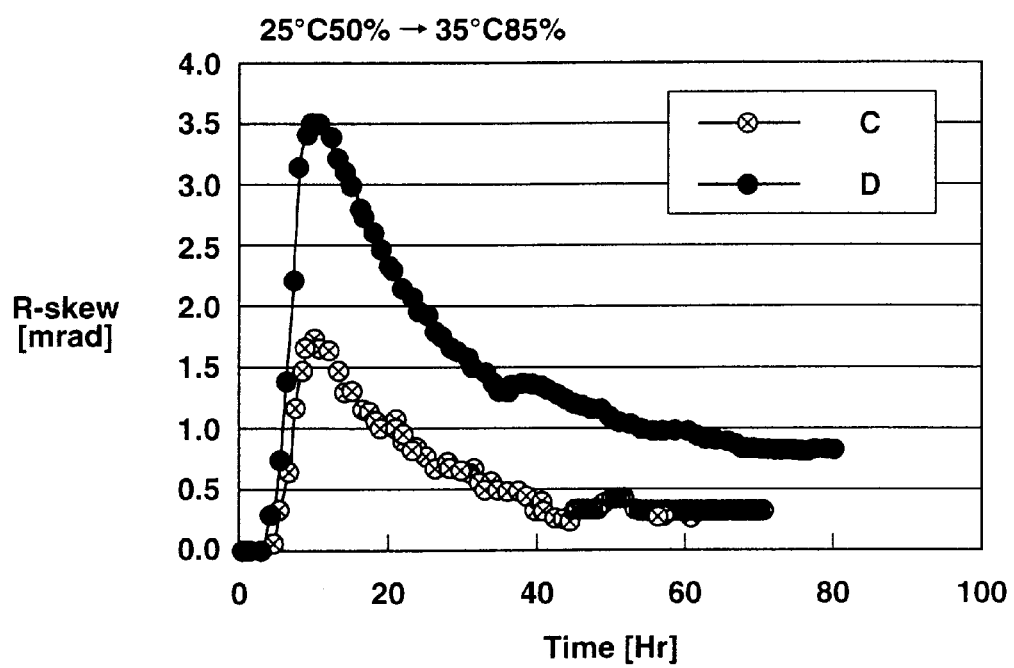
FIG. 6 is a graph showing states of warps occurring when the environmental temperature and humidity have been changed.

FIG. 6 shows change in the warp of the disc C and the disc D when the environmental temperature and humidity were changed. The environmental temperature and humidity were changed from 25° C. and 50% to 35° C. and 85% in 3.5 hours. After the change was started, change in the warp reached its peak in about 9 hours. The disc C encountered a variation of 1.7 mrad, while the disc D encountered a variation of 3.5 mrad.

As described above, according to the present invention, a sufficiently large amplitude of a signal can be maintained even in a magneto-optical system having a small amplitude of a reproduced signal such that the spatial frequency of the shortest recorded signal train was 1.1×NA/λ(line/m) or lower. Thus, reduction in the signal imbalance caused from birefringent fluctuations was permitted.

Since the vertical birefringence, the coefficient of water absorption and the thermal coefficient of expansion of the substrate satisfy proper ranges, jitters can be prevented. Therefore, warp of a disc caused from change in the environmental temperature and humidity can be prevented even if the disc is a single-plate disc.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magneto-optical recording medium comprising:

a substrate incorporating a first dielectric film, a magneto-optical recording film, a second dielectric film, a reflecting film and a protective layer which are sequentially formed thereon so that a Kerr effect is used to read data, wherein when assumptions are made that the wavelength of reproducing light is $\lambda$(m) and the number of apertures of a lens is NA, the spatial frequency of a shortest recorded signal train is $1.1 \times NA/\lambda$(line/m) or greater and the photoelastic coefficient of said substrate is $50 \times 10^{-13}$ cm$^2$/dyne or smaller.

2. A magneto-optical recording medium according to claim 1, wherein the vertical birefringence of said substrate is $250 \times 10^{-6}$ or smaller.

3. A magneto-optical recording medium according to claim 1, wherein the coefficient of water absorption of said substrate is 0.2 wt % or lower and the thermal coefficient of expansion of said substrate is $6.5 \times 10^{-5}$ cm/cm·° C. or lower.

4. A magneto-optical recording medium according to claim 1, wherein data is read by magnetically induced super resolution.

* * * * *